M. A. YEAKLEY.
TROLLEY STAND.
APPLICATION FILED NOV. 3, 1908.
1,191,054.
Patented July 11, 1916.
3 SHEETS—SHEET 1.
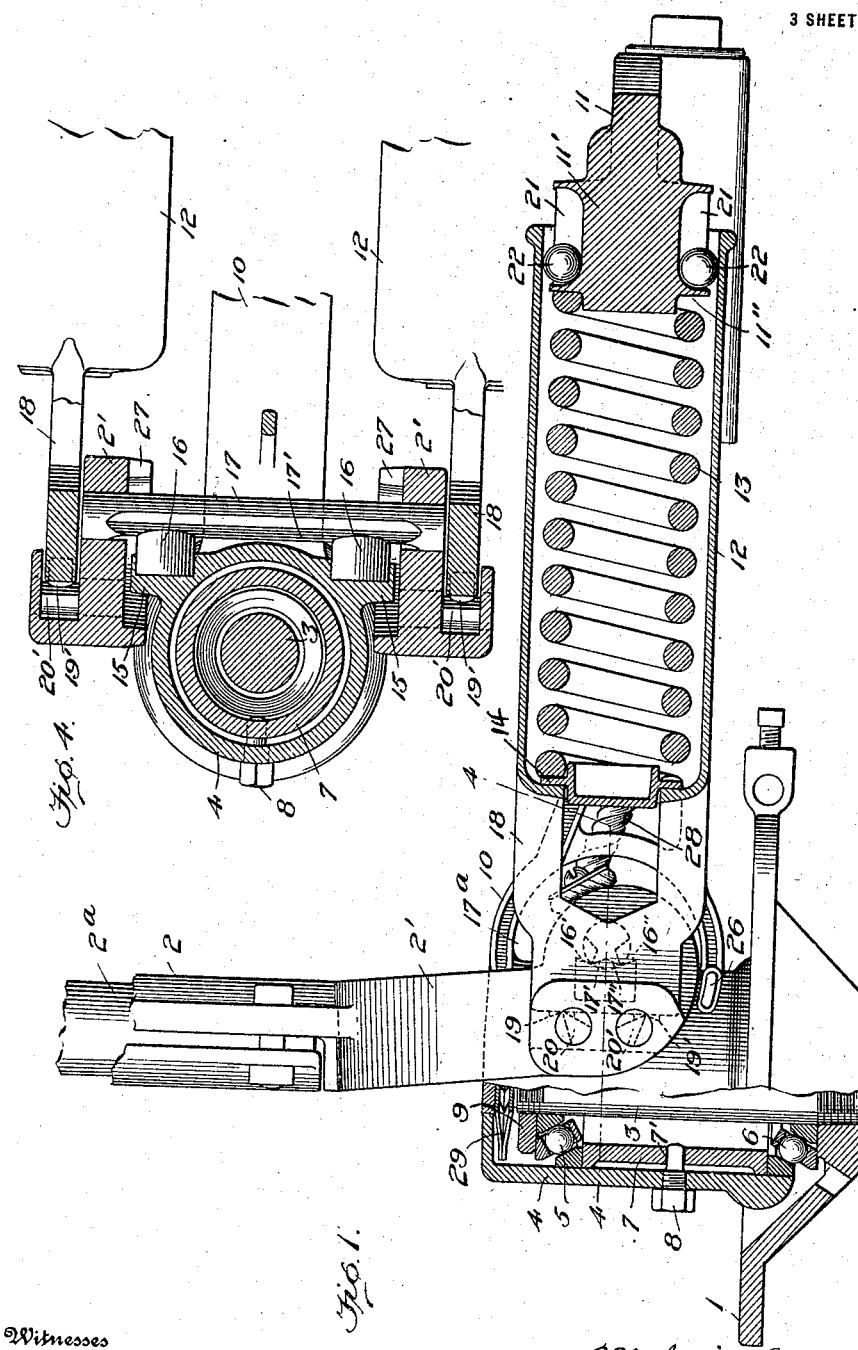
Witnesses
Edwin L Bradford
Inventor
Melvin A. Yeakley
By Edward R. Alexander
Attorney

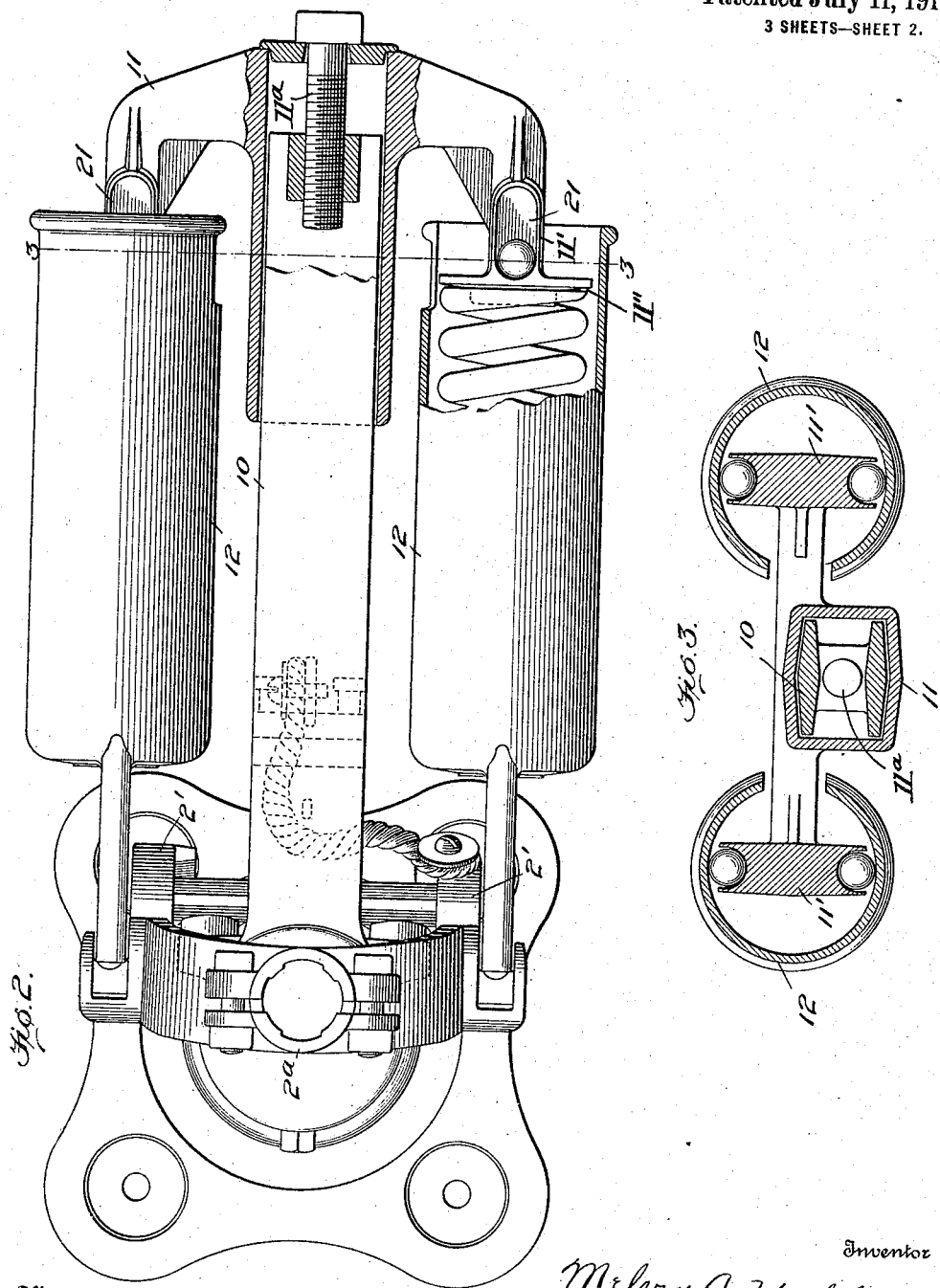

M. A. YEAKLEY.
TROLLEY STAND.
APPLICATION FILED NOV. 3, 1908.
1,191,054.
Patented July 11, 1916.
3 SHEETS—SHEET 3.
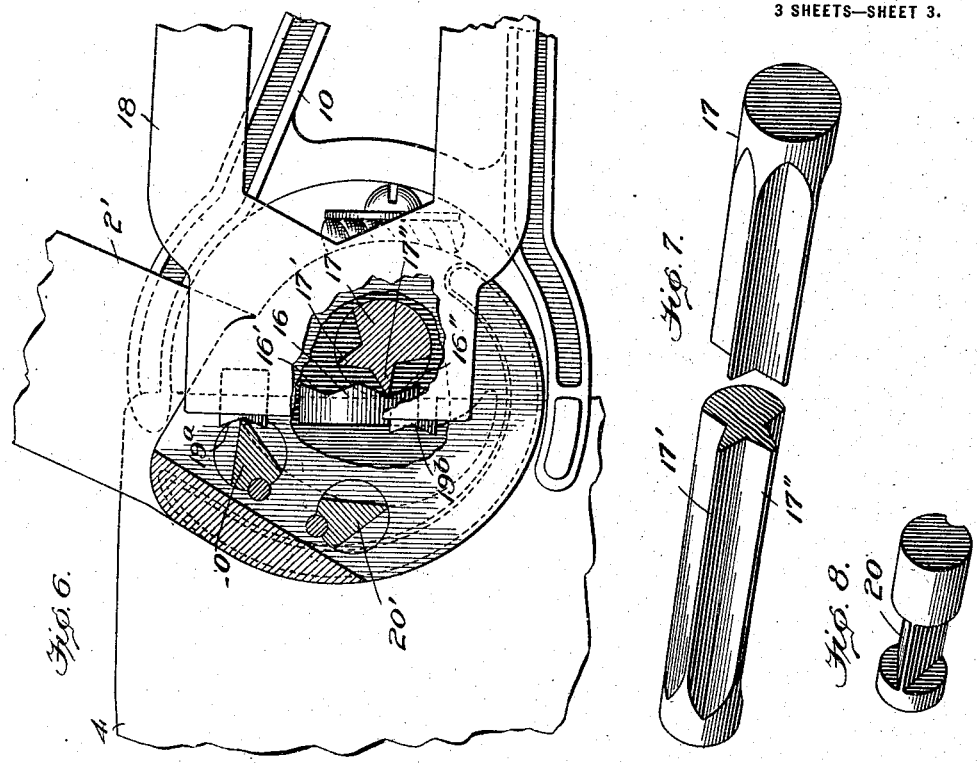
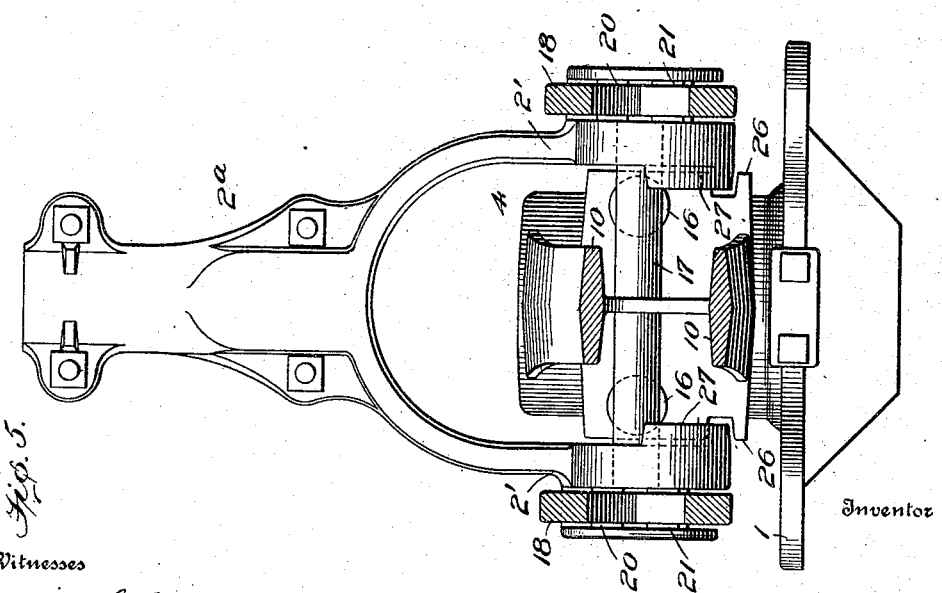

UNITED STATES PATENT OFFICE.

MELVIN A. YEAKLEY, OF CANTON, OHIO, ASSIGNOR TO JOHN E. McLAIN, OF CANTON, OHIO.

TROLLEY-STAND.

1,191,054.  Specification of Letters Patent.  Patented July 11, 1916.

Application filed November 3, 1908. Serial No. 460,919.

*To all whom it may concern:*

Be it known that I, MELVIN A. YEAKLEY, a citizen of the United States, residing at Canton, in the county of Stark and State of Ohio, have invented certain new and useful Improvements in Trolley-Stands, of which the following is a specification, reference being had therein to the accompanying drawings.

This invention relates to a trolley stand adapted to pivotally support a trolley pole on a vehicle.

One object of the invention is to provide means for reducing the friction between the trolley pole and its supporting means to a minimum.

Another object of the invention is to provide novel means for reducing the friction between the elements of a trolley stand to a minimum, including that between the pole carrier and the base.

Another object of the invention is to provide combined compression means operating precisely similarly for elevating the pole against the trolley wire and for buffing the pole when the trolley thereon leaves the wire.

Another object of the invention is to provide means, including a spring or springs always compressed from the same end, for elevating the pole and pressing the trolley against the trolley wire, irrespective of which side of the vertical central plane of the base the trolley pole is on.

Another object of the invention is to produce a low-down trolley stand, that is, one which occupies a minimum space vertically above the top or roof of the car, especially when the trolley pole is drawn down as closely as possible to the roof or top of the car.

Another object of the invention is to provide a trolley stand with incased operating springs.

Further objects of the invention will be obvious from the description of the combination or combinations of parts hereinafter made.

Referring to the drawings: Figure 1 is a side elevation of a trolley stand, embodying my invention, parts being broken away, and illustrating the pole in vertical position. Fig. 2 is a top plan view of the stand. Fig. 3 is a transverse section on the line 3—3 of Fig. 2. Fig. 4 is a sectional view on line 4—4 of Fig. 1. Fig. 5 is a transverse sectional view taken behind the casing and looking toward the pole carrier. Fig. 6 is a fragmentary side view, enlarged, parts being shown in section and broken away. Figs. 7 and 8 are detail views.

In the drawings, 1 indicates a base which may be suitably secured to the top or roof of a trolley car.

2 indicates a trolley pole carrier for supporting a trolley pole 2ª. It is bifurcated at its lower end to form legs 2′, 2′, as shown.

The pivotal supporting means for the carrier which permit it to swing in horizontal directions may be of any preferred construction. As illustrating one form of such means, I have shown a vertical stud 3 secured to the base 1 and a casing 4, preferably of inverted cup shape, adapted to set over and swing about the stud. Mounted between the stud 3 and casing 4 are sets of annular anti-friction bearings 5, 6, preferably arranged near opposite ends of the stud 3.

7 indicates a sleeve surrounding the stud 3, and arranged to space the annular bearings 5, 6. A bolt 8 screws into the casing 4 and enters an aperture or slot 7′ in the sleeve, to lock the casing 4 and the sleeve together.

9 indicates a nut engaging the outer end of the stud 3 for adjusting and holding the bearings 5, 6, and sleeve 7 in proper relation to each other.

10 indicates a rod or arm fixed to or formed integral with the casing 4.

11 indicates a cross head, preferably of T-shape, carried by and slidably supported upon the free end of said rod, and having at its opposite ends heads 11′, 11′, that are formed with spring abutment surfaces 11″, 11″.

12, 12, indicate a pair of spring-inclosing cylinders arranged on opposite sides of and longitudinally of the rod 10.

13, 13, indicate combined elevating and buffing springs, each arranged within a cylinder and engaging at one end with an abutment plate 14 which is preferably detachably mounted thereon and at its opposite end with the adjacent abutment surface 11″. The outer end of each cylinder is open and partially incloses one of the abutment heads on the cross head 11.

11ª indicates a bolt adapted to adjustably connect the head 11 with the rod 10. The shank of the bolt 11ᵃ has a screw-threaded connection with the rear end of the rod 10 and when rotated in one direction or the other operates to adjust the tension of the springs 13.

The pivotal supporting means between the horizontally rotatable casing 4 and the trolley carrier 2 to permit the latter to swing in vertical directions comprise substantially anti-friction bearing or contact elements, preferably a series of knife edge contact devices.

15, 15, indicate a pair of bearing supports arranged on the casing 4 at opposite sides of the rod 10, and preferably formed integral with the casing. Each of the supports 15 is recessed to receive a bearing block 16 having two horizontally arranged grooves 16′, 16″.

17 indicates a cross rod or pin fixed to the legs 2′, 2′ of the trolley pole carrier and extending through an opening 17ᵃ formed in the strut rod 10. One surface of the rod 17 is formed with two knife edges 17′, 17″, adapted to enter and engage the walls of the grooves 16′, 16″, respectively, of the blocks 16.

18, 18, indicate a pair of thrust members, each carried by one of the cylinders 12. Each of the said members is formed with two recesses to receive bearing blocks 19, 19′, one of the blocks being arranged above and the other below the axis of the thrust member. Each of these blocks is formed with a groove, the groove in the upper block being designated 19ᵃ and the groove in the lower block being designated 19ᵇ, and each extending crosswise in a horizontal direction.

20, 20′, indicate the knife edge contacts arranged to coöperate with the grooves 19ᵃ, 19ᵇ, respectively, of the blocks 19, 19′, in each leg 2′ of the pole carrier.

In Fig. 1 I have shown the trolley pole supported vertically by the springs 13, coöperating through all of the knife edge bearings.

Referring to Fig. 6, it will be seen that the trolley pole is inclined from the vertical and in the position it occupies when pressing the trolley wheel into engagement with the trolley wire. In this position of the pole, the contacts 16″, 17″, and contacts 20, 19ᵇ are in coöperation, the latter contacts acting through the thrust members 18, 18, and cylinders 12 to compress springs 13.

If the pole leaves the trolley wire, the springs 13 will force its free end violently upward past the vertical position when the pole is in this latter position, it will be understood that the contacts 16′, 17′, and the contacts 20′ and 19ᵇ, respectively, have come into engagement, and that the latter contacts act through the thrust members 18, 18, and cylinders 12, to compress the springs 13. By this construction, one set of contact devices operates to support the pole carrier 2 and to compress the springs 13 when the free end of the pole is at one side of the central vertical transverse plane of the trolley stand, and another set of contact devices operates to support the pole carrier and to compress the springs when the free end of the pole is on the opposite side of the said vertical plane.

It will be noted that the compression of the springs is always effected by the movement of the same end of each spring toward the other end thereof, irrespective of which sets of bearing devices is in operation. It will also be obvious from the construction just described, that the pole may be drawn down toward either end of the car without swinging the casing 4 and the elevating springs 13 about the axis of the connection which permits the movement of the pole in horizontal directions, as is largely customary at the present time.

As the contact devices 20, 20′, engage their coöperating surfaces on the thrust members 18, 18, carried by the cylinders 12 at points which are on opposite sides of the axis of said thrust members in order to permit a telescoping of the spring-containing cylinders 12 relative to the abutments 11′ without frictional resistance to the movements of the cylinders, I provide novel means for pivoting and slidably connecting the cylinders to the latter. These means preferably comprise two elongated grooves 21 formed in the upper and lower surfaces of the abutments 11′ and extending longitudinally of the cylinders 12. In each groove is provided a ball 22 which is free to roll or play from end to end of the groove and with which the inner surface of the surrounding cylinder 12 may engage. This construction forms an antifriction rolling support between each cylinder and the abutments 11′ therein, and at the same time permits the inner ends of the cylinders 12 and the thrust members 18 to move up and down slightly.

26 indicates lugs formed on the opposite sides of the casing 4 and directly below the bearing supports 15.

27 indicates curved ribs formed on the inner surface of each of the legs 2′, 2′, of the pole carrier, and each adapted to normally move freely in the passageway between the adjacent lug 26 and support 15, but to engage either with said adjacent lug 26 or support 15, for preventing the trolley pole carrier from getting out of alinement with its pivotal contact devices, and the disarrangement of coöperating active bearing devices in the event of any abnormal jar or strain being received by the trolley stand which would tend to throw said bearing devices out of proper relative engagement.

28 is a conductor of relatively low resistance to electricity, preferably a flexible copper cable, arranged between the pole carrier 2 and the pivot casing 4; its purpose is to conduct the current from the pole in shunt around the antifriction bearing in order to prevent the resultant heat due to an excessive current flowing through said bearing elements from drawing the temper of said bearing elements, and to furnish a path of low resistance between the pole carrier and the casing 4.

29 is a brush interposed between the casing and the stud 3 to conduct the current thereto.

It will be understood, that as the free end of the trolley pole passes from one side to the other of the vertical transverse plane in which said pole stands when substantially vertical, one set of knife edge bearings including corresponding elements on cross pin 17 and on the thrust members 18, moves out of operation and the other set moves into operation.

The angles of the knife edge bearings on the casing 4 and cross pin 17 are preferably such that when either pair of bearings for controlling the vertical swinging movement of the pole toward the opposite ends of the car are in operation, the flat surfaces of the bearing elements will not engage with each other until the pole has been moved down below a horizontal position, but when the pole is in mid or vertical position the adjoining flat surfaces of the blocks 16 may lie in engagement with the adjoining flat surfaces between the edges 17', 17'' of the pin 17.

Many alterations in construction, and many widely differing embodiments and applications of my invention will suggest themselves to those skilled in the art of making trolley stands, without departing from the scope and spirit thereof. My disclosures and description herein are purely illustrative and are not intended to be in any sense limiting.

The springs 13 mounted within the cylinders, are preferably of a length to prevent buckling between their opposite ends so that, when compressed, they will not engage with the opposite sides of the cylinders and cause friction between these parts.

What I claim is—

1. The combination of a support having a vertical bearing, a trolley pole carrier, a contact member carried by the carrier and rockably engaging different portions of said bearing to permit swinging of the carrier thereon in vertical directions on different axes, and means engaging said carrier at one side of said contact member and tending to elevate said pole carrier and maintain said contact member in engagement with said bearing.

2. The combination of a support having a vertical bearing, a trolley pole carrier, a pivot member fixed to said carrier and provided with a plurality of contact members arranged to rockably engage with said support to permit said carrier to swing vertically, and means engaging said carrier at one side of said contact member and tending to swing said carrier upwardly.

3. The combination of a support having a vertical bearing, a trolley pole carrier having bifurcations, a pivot member fixedly supported at its opposite ends by said bifurcations and provided with a plurality of contact members arranged to rockably engage with said support between said bifurcations to permit said carrier to swing vertically, and means tending to swing said carrier upwardly.

4. The combination of supporting means provided with a grooved bearing, a trolley pole carrier having bifurcations at its lower end arranged upon opposite sides of said bearing, a pivot element fixedly supported at its opposite ends by said bifurcations and provided with a contact member arranged to fit within and rockably engage said grooved bearing to permit the pole carrier to swing in vertical directions, and means acting on said carrier for elevating it and maintaining the said contact member in engagement with said grooved bearing.

5. The combination with a support, a trolley pole carrier and means tending normally to hold the carrier against the support and in elevated position, of anti-friction devices between the said carrier and said elevating means and through which said elevating means operates upon the carrier, and anti-friction devices between the carrier and the support to take the thrust therebetween and permit the carrier to swing in vertical directions.

6. The combination of supporting means, a trolley pole carrier, an elevating member, and means for pivotally mounting the pole carrier on said supporting means comprising a set of contacts carried by the pole carrier, one of said contacts engaging with the supporting means and the other of said contacts engaging with said elevating member.

7. The combination of supporting means, a trolley pole carrier, an elevating member, means for operating said member, and means for pivotally mounting the trolley pole carrier on the supporting means, said mounting means comprising contacts between the pole carrier and the supporting means and separate contacts between the carrier and the elevating member.

8. The combination of a support, a trolley pole carrier, an elevating member, and means comprising contact members, one of which rocks relative to the other, between the carrier and the support, and a separate contact member between the carrier and said elevating member, for pivotally mounting the carrier relative to said support.

9. The combination of supporting means, a trolley pole carrier, elevating means for the carrier including knife edge contacts one of which is carried by the pole carrier, and separate knife edge contacts between the pole carrier and the supporting means for pivotally supporting the carrier thereon.

10. The combination of a support having a bearing, a pivot element engaging said bearing and rockable thereon toward and from its opposite ends, a pole carrier fixed to and movable with said pivot element, whereby it is swingable toward the opposite ends of said support, and means tending to swing the carrier upwardly.

11. The combination of a support, a pole carrier, pivot means having a pair of pivot members arranged to engage said support, one of said members forming the pivot for the carrier when it swings downwardly toward one end of the support and the other of said members forming the pivot for the carrier when it swings downwardly toward the opposite end of the support, elevating means arranged at one side of said support, and contact means carried by the carrier and arranged to engage said elevating means when the carrier swings toward either end of said support.

12. The combination of a support having a vertical bearing, a pole carrier, pivot means having a pair of pivot members arranged to engage said bearing, one of said members forming the pivot for the carrier when it swings downwardly toward one end of the support and the other of said members forming the pivot for the carrier when it swings downwardly toward the opposite end of the support, contact means carried by the carrier and normally arranged in a different vertical plane from said bearing, and elevating means engaging said contact means and tending to swing the carrier upwardly.

13. The combination of a support, a trolley pole carrier, a pivot element on said carrier arranged to engage said support and permit the carrier to swing vertically, an elevating member arranged to engage said carrier above and below said pivot element, and means tending to move said elevating member in one direction.

14. The combination of a support, a trolley pole carrier, a pivot element on said carrier arranged to engage said support to permit the carrier to swing vertically, an elevating member, a pair of contact devices on said carrier arranged to engage said elevating member above and below the axis of said pivot element when the carrier is in a substantially vertical position, and means tending to move the elevating member in one direction.

15. The combination of a support, a pole carrier, a pivot element provided with upper and lower pivot members arranged to engage said support above and below the axis of said element when the carrier is in a substantially vertical position and serve as pivots therefor when the pole carrier is operated toward the opposite ends of the support, an elevating member, upper and lower contact devices carried by said carrier and arranged to engage the elevating member when the carrier is in a vertical position, and means tending to move the elevating member toward said contact devices, one of said pivot members and the contact device remote therefrom being arranged to coöperate when the pole swings toward one end of the support.

16. The combination of a support, a pole carrier, means for pivoting the pole carrier on the support to swing from a substantially vertical position toward the opposite ends thereof, a spring arranged horizontally substantially in the plane of the carrier pivoting means, and an elevating member actuated by said spring in one direction and operatively engaging said carrier on opposite sides of its pivoting means, whereby said elevating member tends to swing the pole carrier upwardly when it is moved toward either end of the support.

17. The combination with a base and a trolley pole carrier, of means for supporting the said carrier on the base to permit the swinging thereof in vertical directions, a spring, and means interposed between one end of said spring and said carrier, the said means being actuated by the carrier and operating to compress the spring in one direction away from the pivot on which said carrier swings when said carrier is moved from the vertical position toward either end of the base.

18. The combination of a support, a pole carrier, pivot devices between said carrier and said support permitting the carrier to swing vertically, an elevating member, a spring for operating said elevating member, and spaced devices carried by the carrier, one of said devices being arranged to engage said elevating member and move it in opposition to said spring when the carrier swings downwardly toward one end of the support and the other of said devices being arranged to engage said elevating member and move it in opposition to said spring when the carrier swings downwardly toward the opposite end of said support.

19. The combination of supporting means, a trolley pole carrier, means for pivotally mounting said carrier on said supporting means, means arranged to act in one and the same direction for elevating and buffing the carrier, and a pair of contact devices carried by said carrier and disposed upon opposite sides of the pivot for the carrier and engaging with said elevating and buffing means when the latter is in normal vertical position, one of said devices being disengaged from said elevating and buffing means when the carrier is inclined to either side of its normal vertical position.

20. The combination of a support, a trolley pole carrier, means for elevating the carrier including contact devices, one of which is carried by the pole carrier, operating when the pole carrier is swung downwardly toward one end of the support, and separate contact devices, one of which is also carried by the pole carrier, operating when the said pole carrier is swung downwardly toward the opposite end of the support, and pivot devices between the trolley pole carrier and said support.

21. The combination with a support and a trolley pole carrier, of means for mounting said carrier on the support to permit swinging thereof in vertical directions, a spring, an elevating member interposed between said spring and said pole carrier and arranged to compress said spring when the carrier moves to either side of the vertical, and means arranged to engage said elevating member on opposite sides of its longitudinal axis to move it in opposition to said spring.

22. The combination of a support, elevating means including a movable member and a spring for operating said member, a trolley pole carrier, and a plurality of sets of contact elements between said carrier and said support and said elevating means for swingably supporting said carrier on said support, said elevating means serving to swing the carrier upwardly when it is moved to either side of the vertical position, one set of contact elements operating when the pole moves toward one end of the support and the other set of contact elements operating when the pole moves toward the opposite end of the support and one element of one set of contact elements being arranged to engage the elevating member on one side of its axis and one element of the other set of contact elements being arranged to engage the elevating member on the opposite side of its axis.

23. The combination of a support, a trolley pole carrier having bifurcations at its lower end, means for supporting said carrier on the support permitting it to swing in vertical directions, a compression spring adapted through its expansion at one end in one and the same direction to elevate and buff the carrier, and means engaging the spring at one end and actuated by said bifurcations for compressing it.

24. The combination of a support, a trolley pole carrier having bifurcations at its lower end, means for supporting said carrier on the support permitting it to swing in vertical directions, a compression spring adapted through its expansion at one end in a direction toward the pivot for the carrier to elevate and buff the carrier, and means engaging with the spring at one end and actuated by said bifurcations for compressing said spring in a direction away from the pivot for the carrier.

25. The combination of a support, a trolley pole carrier, a bearing carried by the support, a movable contact device carried by the pole carrier and engaging with said bearing, and elevating means for the pole carrier including an elevating member, a contact carried by the pole carrier and arranged to operate the elevating member when the pole carrier is drawn down toward one end of the support and a separate contact also carried by the pole carrier and arranged to operate the elevating member when the pole carrier is drawn down toward the opposite end of said support.

26. The combination of a support provided with a bearing member, a pole carrier having bifurcations, a contact element supported at its opposite ends by said bifurcations and engaging said bearing member therebetween, said element being arranged to rock upwardly and downwardly on said bearing to support the carrier on different axes as it swings to either side of a substantially vertical position, and means tending at all times to swing said carrier upwardly.

27. The combination of a support provided with a bearing formed with a pair of parallel grooves, a pole carrier having bifurcations, a pivot member supported at its opposite ends by said bifurcations and provided with a pair of contact members one of which is arranged to fit within one of the grooves of said bearing and permit the carrier to swing downwardly toward one end of the support and the other of which members is arranged to fit within the other groove of said bearing and permit the carrier to swing downwardly toward the other end of the support, and means tending at all times to swing said carrier upwardly.

28. The combination of supporting means, a trolley pole carrier, an elevating member, pivot devices between the trolley pole carrier and the supporting means, engaging devices between the trolley pole carrier and said elevating member, and means for yieldably and swingably supporting the said elevating member, the yieldable means for said elevating member being swingable therewith.

29. The combination of supporting means, a trolley pole carrier, an elevating member, pivot devices between the pole carrier and the supporting means, engaging devices between the pole carrier and one end of the said elevating member, means for swingably and slidably supporting the other end of said elevating member, and compression means carried by said elevating member interposed between it and the supporting means for said member.

30. The combination of supporting means, a trolley pole carrier, pivotal connections between said carrier and the supporting means, and means for elevating the carrier comprising an elevating member having an abutment, means for swingably and slidably supporting one end of said elevating member, a stationary abutment and a compression spring interposed between the stationary abutment and the abutment on said elevating member, the opposite end of said elevating member being arranged to engage and move with said carrier and the spring being movable in vertical directions with said elevating member.

31. The combination of supporting means, a trolley pole carrier, an elevating member, a compression spring therefor, pivot devices between the pole carrier and the supporting means, engaging devices between the pole carrier and one end of the said elevating member, and means for swingably and slidably supporting the other end of said elevating member, the end of the spring which engages said elevating member being swingable therewith.

32. The combination of a support, a trolley pole carrier pivotally mounted on said support to swing in vertical directions, a separate support, an elevating member arranged to be engaged by the carrier, a spring interposed between said elevating member and said separate support, and pivotal connections between said elevating member and said separate support permitting the elevating member to slide and swing relative thereto.

33. The combination with supporting means and a trolley pole carrier, of means for pivotally mounting the carrier on said supporting means to swing in vertical directions, a spring, an abutment for one end of said spring, and a device having pivotal connection at one end with said carrier and swingably mounted at its opposite end on said abutment and engaging the opposite end of the spring for compressing it.

34. The combination with supporting means and a trolley pole carrier, of means for pivotally mounting the carrier on said supporting means to swing in vertical directions, a spring, an abutment for one end of said spring, and a device having pivotal connection at one end with said carrier and swingably mounted at its opposite end on said abutment and engaging the opposite end of the spring for compressing it, the said device coöperating with the abutment to support the spring therebetween.

35. The combination of supporting means, a trolley pole carrier pivotally mounted on said supporting means so as to swing in vertical directions, an elevating member arranged to be engaged by said carrier, means for supporting said elevating member and permitting it to slide longitudinally and move in vertical directions, and a spring for operating said elevating member against the action of said pole carrier, one end of said spring being arranged to engage and move longitudinally and vertically with the elevating member.

36. The combination of supporting means, a trolley pole carrier pivotally mounted on said supporting means so as to swing in vertical directions, an elevating member arranged to be engaged by said carrier, means for supporting said elevating member and permitting it to slide longitudinally and move in vertical directions, the said means including anti-friction bearings, and means for operating said elevating member against the action of said pole carrier, one end of said operating means being arranged to engage and move longitudinally and vertically with said elevating member.

37. The combination of supporting means, a trolley pole carrier pivotally mounted on said supporting means to swing in vertical directions, a separate support, an elevating member arranged to be engaged by the carrier, a spring interposed between said elevating member and said separate support, and pivotal connections between said elevating member and said separate support permitting the elevating member to slide and swing relative thereto, the said pivotal connections comprising a ball mounted in a recess formed in said separate support.

38. The combination with supporting means and a trolley pole carrier pivotally mounted thereon to swing in vertical directions, of an elevating spring, a member supporting the spring and arranged to compress it by the movement of the trolley pole carrier, connecting means between one end of said member and the said carrier, and means for swingably and slidably supporting the opposite end of said member.

39. The combination with supporting means and a trolley pole carrier pivotally mounted thereon to swing in vertical directions, of an elevating spring, a cylinder inclosing the spring and arranged to compress it by the movement of the trolley pole carrier, connecting means between one end of the cylinder and the said carrier, and anti-friction devices for supporting the opposite end of the said cylinder.

40. The combination of supporting means, a trolley pole carrier, an elevating member including a casing, pivot devices between the trolley pole carrier and the supporting means, engaging devices between the trolley pole carrier and the elevating member, a compression spring mounted in the casing of the elevating member, and means for swingably and slidably supporting the said elevating member and casing.

41. The combination of supporting means, a trolley pole carrier, an elevating member including a casing, means for pivoting the pole carrier on said supporting means, engaging devices between the trolley pole carrier and the elevating member, an abutment, a compression spring mounted within said casing and engaging said abutment, and means for swingably and slidably supporting the said elevating member and casing.

42. The combination of supporting means, a trolley pole carrier, an elevating member including a casing, means for pivoting the pole carrier on said supporting means, engaging devices between the trolley pole carrier and the elevating member, an abutment, a compression spring mounted within said casing and engaging said abutment, and means for swingably and slidably supporting the said elevating member and casing at one end.

43. The combination with a trolley pole carrier and supporting means therefor, of a strut rod carried by said supporting means and provided with an abutment, pivotal means between said carrier and said supporting means, a device, comprising an elevating member and a casing, arranged to be operated by the pole carrier, the rear end of said casing being swingably and slidably supported by said abutment, and a compression spring mounted in said casing and having engagement at one end with said abutment and at its opposite end with said device.

44. The combination of a support, a trolley pole carrier, pivot connections between the support and said carrier permitting the latter to swing vertically, elevating means having pivotal engagement with the carrier and acting thereon to swing the carrier upwardly, and means for preventing displacement of the carrier as it swings on said pivot connections.

45. The combination of a support, a trolley pole carrier, pivot connections between the support and said carrier permitting the latter to swing vertically, elevating means having pivotal engagement with the carrier and acting thereon to swing the carrier upwardly, and coöperating devices carried by the support and carrier for preventing displacement of the carrier as it swings on said pivot connections.

46. The combination of a support, a trolley pole carrier, pivot connections between the support and said carrier permitting the latter to swing vertically, elevating means having pivotal engagement with the carrier and acting thereon to swing the carrier upwardly, a member carried by said support and formed with a groove, and a curved member carried by said carrier and movable endwise in the groove of said member for preventing displacement of the carrier as it swings on said pivot connections.

47. The combination of a support, a pole carrier having legs, pivot devices between said support and said carrier permitting the latter to swing vertically, elevating means having pivotal engagement with said carrier and acting thereon to swing the carrier upwardly, and sets of coöperating devices, one device of each set being mounted on said support and the other device of the set being mounted on the adjacent carrier leg, for preventing displacement of the carrier as it swings on said pivot devices.

48. In a trolley stand, the combination of a support, a trolley pole carrier having legs arranged on opposite sides of said support, a contact element supported at its opposite ends by said legs and fulcrumed on said support therebetween, and a pair of elements carried by one of the legs and said support and coöperating to prevent displacement of the contact element relative to said support.

49. The combination of a support, a pole carrier having legs, pivot devices between said support and said carrier permitting the latter to swing vertically, thrust means having pivotal engagement with said carrier and acting thereon to swing the carrier upwardly, one of said pivot devices being supported at its opposite ends by said legs and engaging the other of said devices therebetween, and sets of coöperating devices, one device of each set being mounted on said support and the other device of the set being mounted on the adjacent carrier leg, for preventing displacement of the carrier as it swings on said pivot devices.

50. The combination of a support, a pole carrier, pivot devices between the carrier and the support permitting said carrier to swing in vertical directions toward either side of said support, the pivot device carried by the carrier having rocking engagement with the support on different axes when the carrier moves toward opposite ends of said support, means tending to swing the pole carrier upwardly, and coöperating devices between the carrier and said support for preventing displacement of the carrier as it swings vertically, the said coöperating devices being constructed to permit the rocking of the pivot device carried by said carrier.

51. The combination of supporting means, a trolley pole carrier, an elevating member, and means, comprising contacts between the carrier and the supporting means and separate contacts between the carrier and the said elevating member, for pivotally mounting the carrier relative to the supporting means, and means for preventing the contacts from getting out of proper alinement.

52. The combination of a base, a casing rotatably mounted upon said base by anti-friction bearings and swingable in horizontal directions, and a pole carrier supported upon said casing by knife edge contact devices and swingable relative to said casing in vertical directions.

53. The combination with a support, a trolley pole carrier and means tending normally to hold the carrier against the support and in elevated position, of anti-friction devices between the carrier and the support to take the thrust therebetween and permit the carrier to swing in vertical directions, anti-friction devices through which said elevating means operates to maintain the anti-friction devices between the support and carrier in contact with each other, and anti-friction devices between the carrier and support and about the axis of which the carrier may swing in horizontal directions.

54. The combination of a base, a trolley pole carrier, supporting means for the trolley pole carrier rotatably mounted on the base, knife edge contact devices between the trolley pole carrier and the said supporting means, an elevating member, knife edge contact devices between the elevating member and the trolley pole carrier, and means for operating the said elevating member.

55. The combination of rotatably mounted supporting means, a trolley pole carrier provided with depending legs, a strut rod carried by the supporting means and arranged between the legs of the trolley pole, a pivotal supporting element for the trolley pole carried by the said legs and engaging said supporting means, and means arranged on opposite sides of the said strut rod for elevating the said trolley pole.

56. The combination of a rotatably mounted supporting means, a strut rod carried thereby, abutments carried by the strut rod and arranged on opposite sides thereof, a trolley pole carrier provided with bifurcations straddling the said strut rod, a pivotal supporting element for the trolley pole carrier supported at its opposite ends by said bifurcations and engaging said supporting means, and a compression spring between each of said abutments and the adjacent bifurcation.

In testimony whereof I affix my signature, in the presence of two witnesses.

MELVIN A. YEAKLEY.

Witnesses:
JOSEPH HOLLIS,
A. M. MCCARTY.

Copies of this patent may be obtained for five cents each, by addressing the "Commissioner of Patents, Washington, D. C."